US008700602B2

(12) United States Patent
Schapker et al.

(10) Patent No.: US 8,700,602 B2
(45) Date of Patent: Apr. 15, 2014

(54) MULTI-DATABASE, RUNTIME DATABASE QUERY PERFORMANCE MONITORING

(75) Inventors: Lawrence E. Schapker, Pittsburgh, CA (US); Jayagopal Theranikal, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 647 days.

(21) Appl. No.: 12/240,814

(22) Filed: Sep. 29, 2008

(65) Prior Publication Data
US 2010/0082517 A1    Apr. 1, 2010

(51) Int. Cl.
G06F 17/30    (2006.01)
G06F 7/00    (2006.01)

(52) U.S. Cl.
USPC .......................................... 707/713; 707/769

(58) Field of Classification Search
CPC   G06F 11/3409; G06F 11/30; G06F 17/30424
USPC .................................................. 707/713, 721
See application file for complete search history.

(56) References Cited

U.S. PATENT DOCUMENTS

| | | | | |
|---|---|---|---|---|
| 5,899,991 A * | 5/1999 | Karch | ............................ | 707/694 |
| 5,953,715 A * | 9/1999 | Cincinatus et al. | ..... | 707/999.001 |
| 6,226,745 B1 * | 5/2001 | Wiederhold | ........................ | 726/1 |
| 6,314,463 B1 * | 11/2001 | Abbott et al. | .................. | 709/224 |
| 6,529,901 B1 * | 3/2003 | Chaudhuri et al. | ..... | 707/999.003 |
| 6,763,359 B2 * | 7/2004 | Lohman et al. | ................ | 707/718 |
| 6,804,662 B1 * | 10/2004 | Annau et al. | ........... | 707/999.002 |
| 6,847,978 B2 * | 1/2005 | Ellis et al. | ...................... | 707/713 |
| 7,058,622 B1 * | 6/2006 | Tedesco | .................. | 707/999.002 |
| 7,113,936 B1 * | 9/2006 | Michel et al. | .......... | 707/999.002 |
| 7,321,888 B2 * | 1/2008 | Day et al. | ....................... | 707/722 |
| 7,509,343 B1 * | 3/2009 | Washburn et al. | ...... | 707/999.001 |
| 7,542,998 B1 * | 6/2009 | Lavie et al. | ............. | 707/999.102 |
| 7,546,312 B1 * | 6/2009 | Xu et al. | ................. | 707/999.102 |
| 7,551,922 B2 * | 6/2009 | Roskowski et al. | ........... | 455/423 |
| 7,958,159 B1 * | 6/2011 | Tran et al. | ...................... | 707/802 |
| 2002/0127993 A1 * | 9/2002 | Zappala | .......................... | 455/404 |
| 2004/0088405 A1 * | 5/2004 | Aggarwal | ..................... | 709/224 |
| 2005/0060292 A1 * | 3/2005 | Day et al. | .......................... | 707/3 |
| 2006/0007901 A1 * | 1/2006 | Roskowski et al. | ........... | 370/338 |
| 2006/0031189 A1 * | 2/2006 | Muras et al. | ........................ | 707/2 |
| 2006/0031200 A1 * | 2/2006 | Santosuosso | ..................... | 707/3 |
| 2006/0149724 A1 * | 7/2006 | Ritter et al. | ....................... | 707/4 |

(Continued)

Primary Examiner — Pavan Mamillapalli
(74) Attorney, Agent, or Firm — Marger Johnson & McCollom PC

(57) ABSTRACT

A method to monitor database performance includes gathering information from a remote, monitored database related to the monitored database performance during a predetermined time, collecting statistics corresponding to any queries executed during the predetermined time, testing at least one rule against the statistics corresponding to each query, and if the testing results in a rule violation, identifying the query that caused the rule violation. A method to monitor database performance includes gathering statistics related to execution of a query statement, comparing at least one of the statistics against at least one rule to determine if the statistics violates a threshold established by the rule, if the statistic violates the threshold, identifying the query statement as a violating query statement, and repeating the comparing and identifying until all rules have been compared. A system has a local repository and a rules engine to gather information from at least one remote, monitored database, locate query statement executions in the information and to collect statistics with regard to the query execution, and test at least one rule against the statistics to determine if the query statement violates the rule.

14 Claims, 5 Drawing Sheets

(56) References Cited

U.S. PATENT DOCUMENTS

| | | | |
|---|---|---|---|
| 2006/0167914 A1* | 7/2006 | Faunce et al. | 707/101 |
| 2007/0299810 A1* | 12/2007 | Riedel et al. | 707/2 |
| 2008/0071759 A1* | 3/2008 | Santosuosso | 707/4 |
| 2008/0168058 A1* | 7/2008 | Gordon | 707/5 |
| 2009/0271360 A1* | 10/2009 | Bestgen et al. | 707/2 |
| 2009/0327242 A1* | 12/2009 | Brown et al. | 707/3 |

* cited by examiner

MULTI-DATABASE, RUNTIME DATABASE QUERY PERFORMANCE MONITORING

BACKGROUND

Database applications having poor performance may result from many causes. One of the more common causes results from issues with query execution. In many databases, queries consist of Structured Query Language (SQL) queries, but the problems may result in other query languages and structures.

Locating a problem query statement or statement amongst the large numbers of well-performing queries in a runtime database environment is a daunting and laborious task. This has led to people working in development to attempt to locate problematic query statements during the design and development process. People working in all phases of application development, including developers, quality assurance engineers, database administrators, and performance engineers, spend considerable efforts to detect and correct problematic queries.

This process typically involves the person monitoring the database during application execution for queries and then removing the well-performing queries. This leaves the potentially problematic queries. One must note that the definition of 'problematic' may be subjective or may depend upon different criteria (execution time, response time, resource usages, etc.) for different databases. As used here, a 'problematic' query means one that causes the database to execute in a manner that is below expectations in at least one aspect (time, resource, results, etc.).

Once only problematic query statements remain in the database, the person must manually gather the entire database provided information relating to the suspect query statement. At this point, the determination must be made as to whether the statement is really problematic. Again, this determination may be subjective. If the query statement is determined to be problematic, the person would then make a correction (if a developer) or provide suggestions (if someone other than a developer) as to how to correct the statement to increase performance.

Typically, this process has to be repeated for every database, and coordination between monitoring efforts is lacking, so problematic statements running in a first database may occur in a second database because there was no way to know that the statement had problems in the first database. As the physical number of monitored databases grows, duplication of effort and the chance of conflicting corrections grow significantly.

DETAILED DESCRIPTION OF THE EMBODIMENTS

Figure 1:
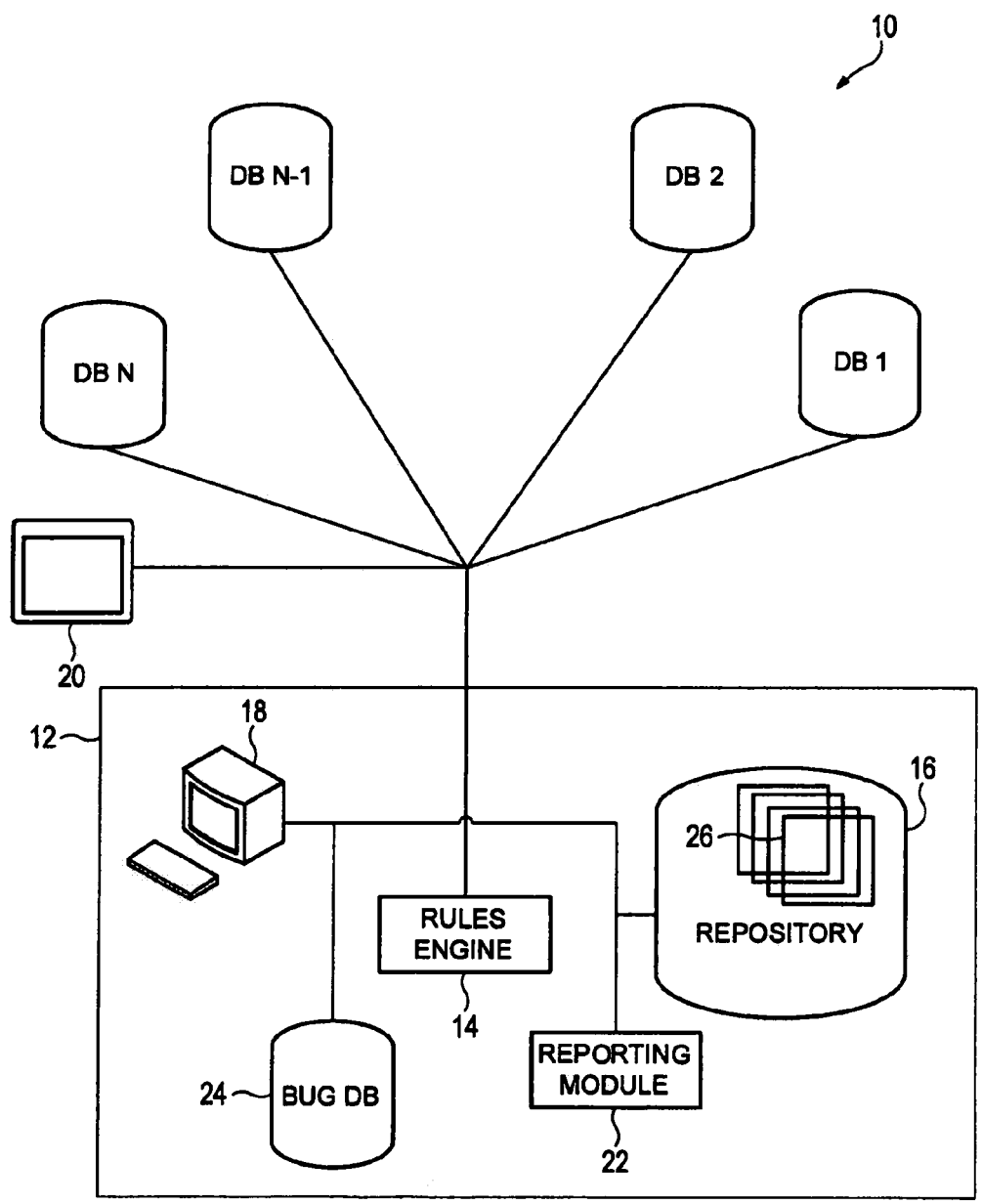
FIG. 1 shows an embodiment of a system having a database performance monitoring.

FIG. 1 shows a database system having a performance monitoring system. Database systems typically have three tiers, a database tier, an applications tier and a client tier. Generally clients access applications in the application tier to operate on or gather information from databases in the database tier. A user may access an application to gather information, for example, and the application converts the request into a query statement that is then transmitted to a database or databases in the database tier.

One issue with query statements arises when the query statement has something 'wrong' or incorrect in it. The query statement may take too long to execute, have too many repetitions or tie up too many resources in the system, such as memory or processing cycles. This lowers the performance of the database as it puts a drag on the system.

In FIG. 1, several databases DB1 through DBn reside in a database system. It must be noted that a database 'system' does not intend to infer, nor should it be implied, that the databases are somehow related or otherwise connected. The databases may reside in diverse architectures and even in diverse environments, customer locations, etc. The databases are defined as being part of the 'system' if they are included in the monitoring performed by the monitoring system 12.

Similarly, monitoring system 12 may be a dedicated set of hardware or merely a collection of resources from within one or more other systems. Further, the monitoring system has several components shown as separate entities, but may actually consist of several different functions of one entity, and any combination in between. For purposes of discussion and ease of understanding, the components will be discussed as shown here, with the understanding that this is merely an example and no limitation should be assumed.

The monitoring system has a rules engine 14 that may be embodied as an application running on a workstation 18 that also has a user interface, or may be an application running on a network. The operation of the rules engine will be discussed in more detail with regard to FIGS. 2-4, but essentially operates to monitor and track query statement executions in the databases being monitored, databases DB1 through DBn. References to the database monitoring tool may be viewed as referring to the rules engine alone or the rules engine in combination with one or more other components shown in FIG. 1.

The local repository 16 may be embodied as an independent database, or may be an allocated set of tables in a database used for other purposes. The local repository is referred to as being 'local' but may actually be located remotely. It is a single location into which data collected from the other databases being monitored is gathered. The single location may include several working tables, such as 26.

A reporting module 22 may actually reside within the rules engine functionality, or it may reside as a separate application or entity. The reporting module allows users to generate reports on the data collected from the databases being monitored, as well as other types of reports, such as time and activity reports on user accounts, etc.

A 'bug' database 24 may reside in the local repository 16 or may reside in a separate database, or in a portion of another database. If one exists, a bug database allows system users to determine if a problematic query statement has already been recorded and whether a fix or correction exists for that statement. Reporting procedures may access a list of problematic or rule-violating query statements and compare it to a list in the bug database to develop a list of issues that need to be resolved.

Many of these components are optional and not necessary to implement the embodiments of the invention. The monitoring tool may consist only of the rules engine 14. The processes discussed with regard to FIGS. 2-4 may be implemented just by the rules engine, or may involve other optional components.

Figure 2:
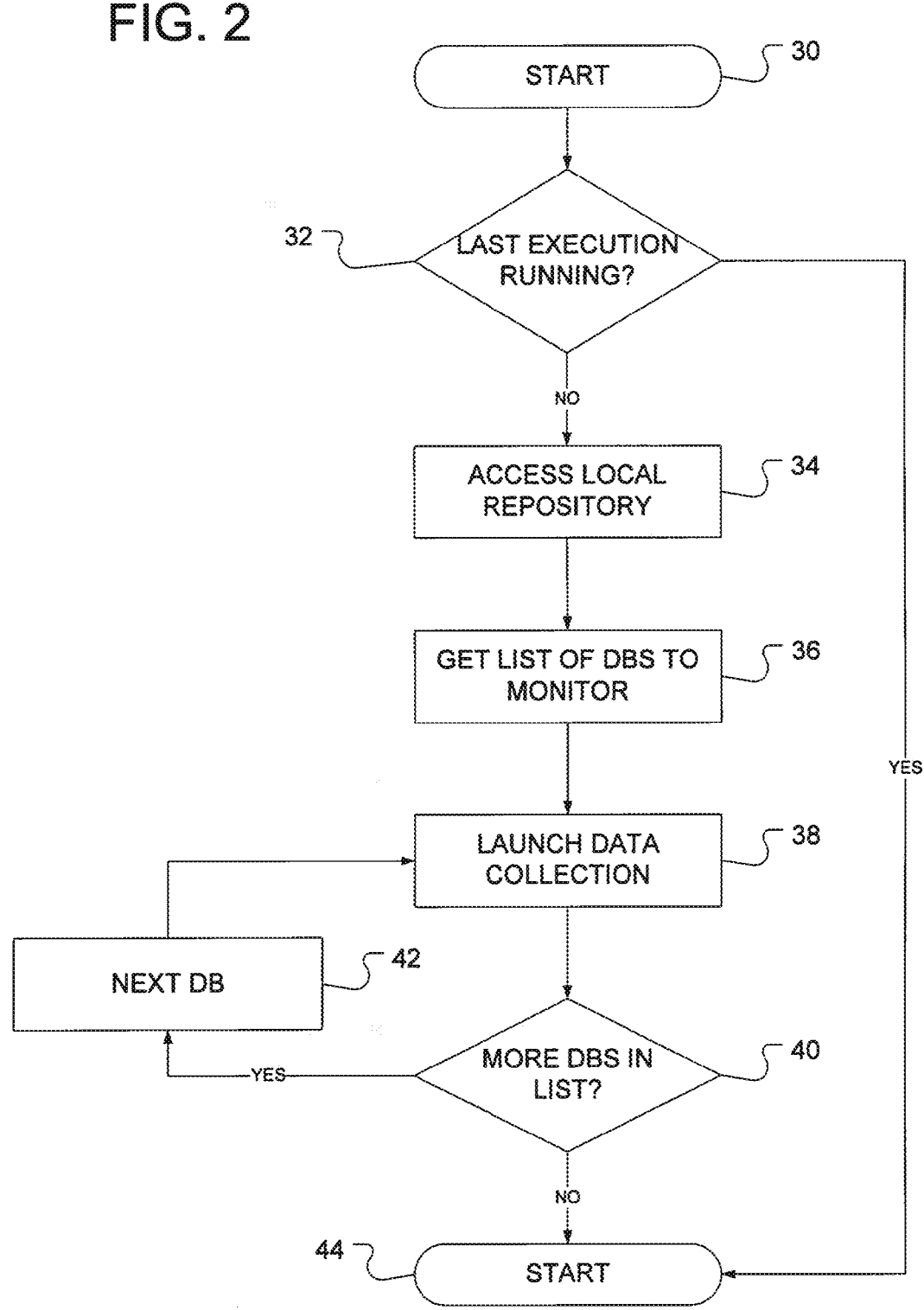
FIG. 2 shows a flowchart of an embodiment of a method to monitor databases for performance.
Figure 3:
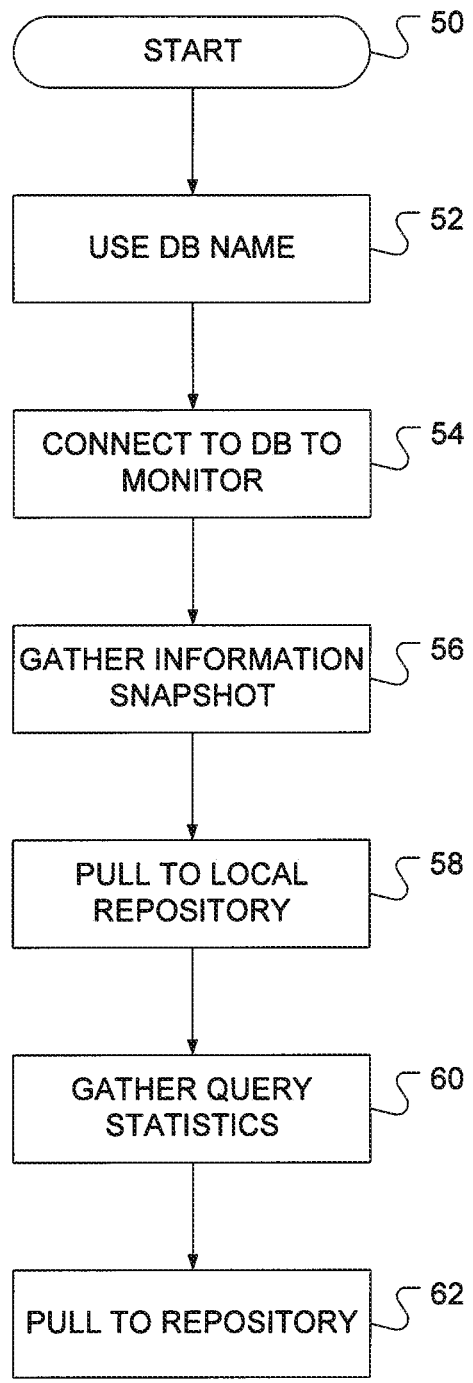
FIG. 3 shows a flowchart of an embodiment of a method to collect data from a monitored database.

FIG. 2 shows a flowchart of an embodiment of a method of monitoring database performance. One aspect of the methods discussed here is timing. As the databases are being monitored while operational, even if only undergoing operational testing in a development environment, the information and statistics will change rapidly. Generally, the processes discussed here will repeat on a periodic basis. It is possible that a previous execution of the monitoring process has not ended before another one is to begin.

In order to handle this situation, when a current execution of the monitoring process is to begin at 30, it first checks to see if the previously-scheduled execution is still running at 32. If it is, the process may exit at 44. Depending upon the user's desire, the process may continue to monitor the previous execution at 32 to see if it completes and then initiates the current execution. Alternatively, the current execution would just exit and the process would launch again at is next regularly scheduled time.

If the last execution is no longer running at 32, the process accesses the local repository at 34. This assumes that the list of databases to be monitored resides in the local repository; it may actually reside anywhere, so long as the rules engine can access it. The list of databases to be monitored is then retrieved at 36. A data collection or gathering process is then spawned or otherwise launched at 38. More discussion about the data collection process will occur with regard to FIG. 3.

At 40, the list of databases is checked to see if there are any more databases that need to be monitored. If so, the process returns to 38 to launch another data collection process for the next database retrieved at 42. This process repeats until all of the databases in the list have had collection processes spawned for them. The process then exits at 44.

One example of the above process is implementable on an Oracle® system. For example, a schema P_MONITORING is created in an applications performance database Appsperf Portal Database PBAPPS to store all of the information needed to generate the reports on query statement violations. In this example, the query statements are in Structure Query Language, SQL. In the case of a new database, the database environment must be registered with the Appsperf Portal Database. Once the registration form is submitted, a procedure MONITOR.DB_CONFIGURE procedure is called. This procedure then creates a database link to the newly registered database.

In addition the MONITOR.DB_CONFIGURE procedure inserts one row in each table (database and db_connect_info) in the portal database with information on the database name, db link name, db id, connect information, etc. of the database. The procedure then launches the data collection from the remote database now registered. For existing databases, the MONITOR.DB_CONFIGURE procedure would launch the data collection process for each database already linked to the portal database.

As mentioned above, FIG. 3 shows a more detailed embodiment of the data collection process. The process is launched at 50, more than likely from a procedure very similar to that shown in FIG. 2. The name of the database to be monitored is then used, the name coming either from the repository as mentioned above, or because it is a newly-registered database.

At 54, the database monitoring module connects to the database to be monitored. In one embodiment, this may be done by 'tunneling,' establishing a secure connection between the database and the monitoring tool through a network. As part of this process, it may be necessary to ensure that the database link has access to the proper database information views, such as its historical views, on the remote database.

Once the connection is established, the monitoring tool then gathers information related to the current 'information snapshot' at 56. The current information snapshot consists of the data in a predetermined time, generally the time stamp of the last gather execution and the current time. This information may then be pulled to the local repository at 58.

Moving the information to the local repository may be an optional procedure. The system may be powerful enough to work with this data on the fly across the network, but generally moving it to one repository local to the monitoring tool will result in faster analysis and less drag on the system.

The data collection process then continues on to gather statistics on the query statements executed during the time period of the current information snapshot at 60. These statistics may include, but is not limited to, buffer gets or accesses during execution, buffer gets per execution, runtime shared memory, executions, and elapsed time per execution, some of which may be for 'online' or real-time query and some which may be for 'batched' queries. These statistics may also be pulled to the local repository at 62. They may also be pulled into a working table in the local repository database, a table that may be change drastically depending upon the rules engine processing of the query statements.

Returning to the example of the Oracles database implementation, the repository database would tunnel using the db link information that was given to the repository when the database registered its environment. The proper view for the link to allow access to the historical views of the remote database may be DBA_HIST_% as an example. Oracle databases generally have a set of views of remote databases referred to as Automatic Workload Repository views. These views include V$ACITVE_SESSION HISTORY, V$METRICGROUP, DBA_HIST_ACTIVE_SESS_HISTORY, DBA_HIST_BASELINE, DBA_HIST_DATABASE_INSTANCE, DBA_HIST_SNAPSHOT, DBA_HIST_SQL_PLAN AND DBA_HIST_WR_CONTROL.

Generally the two kind of data brought from the remote database would be SQL violation data and stale statistic data. The above views in the AWR allow access to the SQL violation data. Stale statistic data, called that because the data changes during each time interval, may be brought to the local repository by running a procedure called DBMS_STATS.GATHER_DATABASE_STATS to collect the statistics of database objects such as tables and indexes. The Appsperf Portal Database then has a table populated db_stat_problems with stale statistics by generating and running an SQL script.

In one embodiment, these procedures are implemented by running three chronology procedures. The first deletes files that are older than the predetermined time interval. For example, if the monitoring tool is monitoring every 30 minutes, files more than 30 minutes old would be deleted and the procedure would run every 30 minutes. A second procedure collects the SQL violation data, at a time interval other than the time interval for which the first chronology procedure runs. The third procedure would then collect the stale statistics. This may be run less often.

Figure 4:
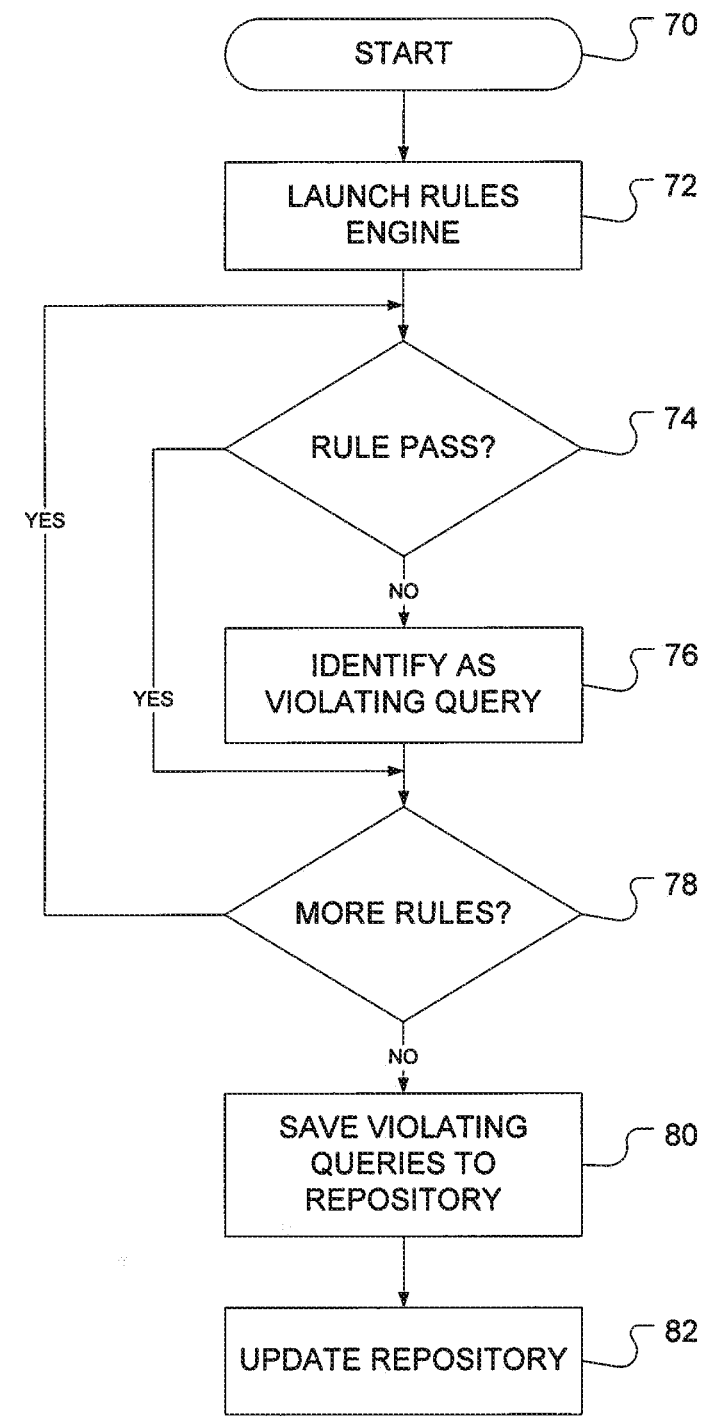
FIG. 4 shows a flowchart of an embodiment of a method to identify a query statement that violates a rule.

Returning to FIG. 3, one can see that at the completion of the last pull to repository or last portion of the data collection process, the information necessary for analysis of the query statement violations is now gathered for the rules engine to process. FIG. 4 shows an embodiment of the rules engine testing process.

The rules engine begins testing each query statement violation at 70. The monitoring tool, which may be the rules engine, launches the process at 72. The statistics corresponding to the query statement that is suspected of be a violating query statement is checked against at least one rule. The rules generally are provided by users, through a user interface. Examples of rules could be set up like 'more than 200,000 buffer gets during execution,' 'using more than 1 MB of shared memory,' or 'executions over 100,000 times.' The rules may differentiate between on-line modules and batched modules, where the query statements are run in large jobs rather than in real-time, with different rules for each. An example may be 'more than 10 seconds elapsed time per execution,' for an on-line module, but the amount of time for a batch module may be 60 seconds. There may also be ways to overcome not knowing whether the module is on-line or batch, using an 'unknown' tag.

In one example, using SQL, the rule violation determination may be set up as a 'where' clause:

```
SELECT SQLID
FROM SQLSTATS /*the working table */
WHERE 1=1 /* the rule's where clause is appended */
AND buffergets > 100000
/
```

If the result of the above is true, the query statement has violated a rule. This then results in the rule being identified as a violating rule. In the SQL example above, the SQL ID may be tagged or otherwise identified, including moving it to a different working table.

At 78, the rules engine checks to see if there are any other rules that the statement may have violated. If the rule has already been identified as a violating rule, this step may be skipped in that instance. However, it is possible that a query statement may not have violated one rule, but have violated another, in which case the process has to continue until the statement is tested against all rules.

At 82, the violating statements are saved to the repository. As mentioned before, previously, violating statements may have been identified in one database, but that information is not available to another database administrator on another database. By saving the violating statements to the repository, it allows developers and administrators to check queries against a body of known violating statements, hopefully preempting the inclusion of those statements in another database application.

The above processes are generally performed by what may be referred to as the 'back-end.' Returning to FIG. 1, the 'front-end' would be those components that allow users to create rules, select reports to be run, as well as monitor the performance of the various databases by reviewing the data produced by the back-end. These may include the reporting module 22 and the user interface 18. In one embodiment the monitoring tool and rules engine functions are available for interaction through a web interface 20, allowing people from all over an enterprise to interact with the monitoring tool and to run reports.

Figure 5:
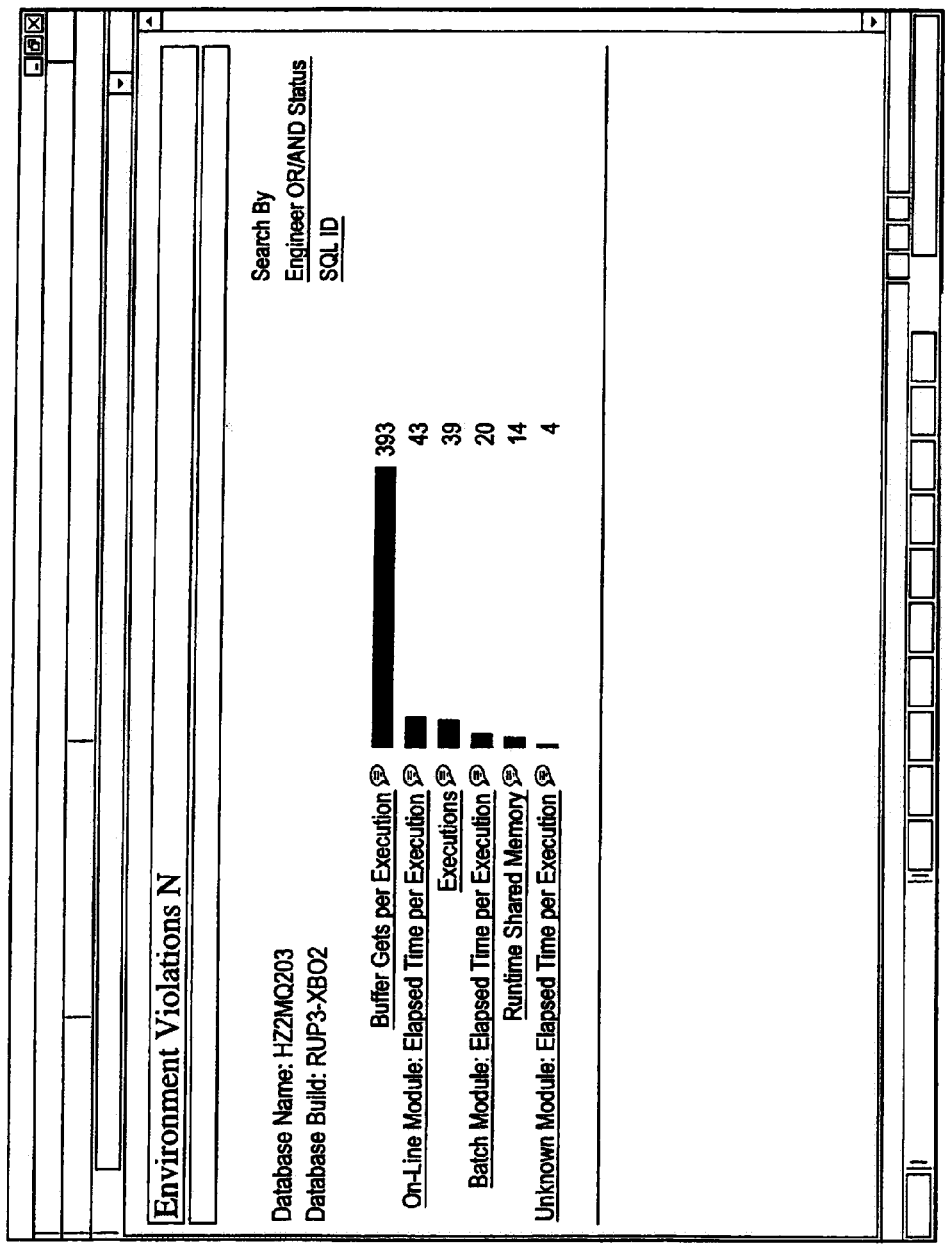
FIG. 5 shows an example of a query statement violation report for a particular database.

In one embodiment, a reporting structure may be organized according to a release version of the environments. The report would show such statistics as the total number of violations and the number of unique SQL statements out of the total violations, the number of SQL statements reviewed (both violating and non-violating) and the number of bugs filed. Using an interactive interface would allow the user to 'drill down' into more detail on any item presented in the report main screen. An example of an SQL violation report for the database named HZ2MQ203 and build version RUP3-XB02 is shown in FIG. 5.

In this manner, users from many different functions within an enterprise may monitor and review query statement violations information for many different versions of many different databases. This affords developers and administrators to avoid duplicating errors between different databases, as well as shortening the time to identify violations.

The above discussion has focused mostly on the 'runtime' or production environment, in which databases are running operationally. The monitoring system may be deployed in testing and development environments as well, allowing the database applications to be tuned and corrected prior to release. No limitation to one or the other environment is intended nor should any be implied. The exemplary monitoring system has been implemented for eBusiness (electronic business) database environments, it can easily extend to monitor PeopleSoft®, Siebel®, Retek®, etc. systems. The reporting system may further be improved to capture application/vendor specific needs to help those applications. Similarly the embodiments may be developed using the newest technologies and reporting tools.

Thus, although there has been described to this point a particular embodiment of a method and system to monitor database performance, it is not intended that such specific references be considered as limitations upon the scope of this invention except in-so-far as set forth in the following claims.

What is claimed is:

1. A computer-controlled method to monitor database performance, comprising:
   receiving at least one rule for query statement execution from a user through a user interface;
   gathering information from a remote, monitored database related to the monitored database performance during a predetermined time during operation of the database;
   collecting statistics corresponding to any queries executed during the predetermined time, the statistics consisting of data gathered from performance of the query;
   testing at least one rule against the statistics corresponding to each query;
   if the testing results in a rule violation, identifying the query that caused the rule violation;
   accessing a list of known rule-violating queries in a local repository to determine if the query causing the rule violation has been previously recorded and to determine if a correction for the query exists; and
   storing the query causing the rule violation in the repository.

2. The computer-controlled method of claim 1, further comprising accessing a repository database to acquire a list of remote databases to be monitored.

3. The computer-controlled method of claim 2, further comprising repeating the gathering, collecting, testing and identifying processes for each database in the list.

4. The computer-controlled method of claim 1, further comprising storing the information in a local repository.

5. The computer-controlled method of claim 1, further comprising storing the statistics in a local repository.

6. The computer-controlled method of claim 1, wherein gathering information comprises pulling data from a history instance and a snapshot instance.

7. The computer-controlled method of claim 1, wherein collecting statistics further comprises collecting, for each query executed during the predetermined time, at least one of:

buffer gets per execution, runtime shared memory, executions, and elapsed time per execution.

8. The computer-controlled method of claim 1, wherein the predetermined time comprises an interval between a last execution time and the current time.

9. The computer-controlled method of claim 8, further comprising updating the repository to update the last execution time.

10. A computer-controlled method to monitor database performance, comprising:
   receiving at least one rule for query statement execution from a user through a user interface;
   gathering statistics related to execution of a query statement during operation of the database;
   comparing at least one of the statistics related to the execution against at least one rule to determine if the statistics violates a threshold established by the rule;
   if the statistic violates the threshold, identifying the query statement as a violating query statement;
   accessing a database of known rule-violating queries in a repository to determine if the rule-violating query statement has been recorded and to determine if a correction exists for the query;
   storing the rule-violating query statement in the repository; and
   repeating the comparing and identifying until all rules have been compared.

11. The computer-controlled method of claim 10, further comprising generating a report identifying any violating query statements.

12. A system, comprising:
   a user interface configured to allow a user to input a rule for query statement execution:
   a local repository consisting of a storage located on a device; and
   a rules engine operating on a computer workstation, the rules engine to:
      gather information from at least one remote, monitored database;
      locate query statement executions in the information and to collect statistics with regard to the query execution during database operations;
      test at least one rule against the statistics to determine if the query statement violates the rule;
      accessing a database of known rule-violating queries in the local repository to determine if the query statement that violates the rule has been recorded and to determine if any correction exists for the query; and
      storing the query statement in the database in the local repository if the query statement violates the rule and has not previously been recorded.

13. The system of claim 12, further comprising a user interface operating on the workstation to allow a user to view results of the test.

14. The system of claim 12, the local repository arranged to store at least one of: a working table to store query statement executions, and a list of databases to be monitored.

\* \* \* \* \*